United States Patent Office 3,032,431
Patented May 1, 1962

---

3,032,431
KAOLIN CLAY COATED WITH SALT OF POLYMERIZABLE ACID
Thomas H. Ferrigno, Metuchen, N.J., assignor to Minerals & Chemicals Philipp Corporation
No Drawing. Filed Jan. 12, 1960, Ser. No. 1,882
8 Claims. (Cl. 106—308)

The subject invention relates to the art of coating kaolin clay with an organic substance so as to convert the normally hydrophilic clay into an organophilic material and relates also to improved polyester resin compositions formulated with the novel coated clay.

Kaolin clay, in its naturally occurring state, is presently used as a mineral filler in the production of thermoset plastics from liquid unsaturated polyester resins. The clay is mixed with a liquid polymerizable unsaturated polyester resin and the mixture, together with a peroxide catalyst and frequently auxiliary ingredients, is cured to crosslink the polyester into a thermoset plastic product. Usually glass fibers are included in the composition as a reinforcing agent. In the case of polyester premixes (frequently called "doughs" or "gunks"), the glass fibers are uniformly mixed with the liquid polyester and filler and the thick mass is molded. In carrying out the so-called "preform" method, a mixture of polyester and filler is impregnated on a mat of glass fibers and the impregnated glass is molded to produce the thermoset glass laminate. The clay is used principally as a bulking agent and also to minimize shrinkage of the resin during curing. The clay is not used, however, to improve the strength of the thermoset resin and, in fact, the use of naturally occurring clay in large quantities usually appreciably reduces the tensile and flexural strength of the plastic product, particularly in premixes.

Furthermore, the clay being hydrophilic in nature, is not readily wet by the liquid polyester resin and it is difficult to disperse the clay in the liquid resin. When used in appreciable quantity, the clay increases the viscosity of the liquid polyester to a considerable degree and produces a marked thixotropic effect. In some instances, the thickening effect is desirable and for certain vertical molding layups and coating applications, thixotropy in polyester resins is highly desirable. However, in many other instances the thickening effect of the clay on the polyester resin is very undesirable inasmuch as it limits significantly the quantity of clay filler which can be incorporated in the polyester while providing a mixture of moldable consistency.

A principal object of my invention is the provision of a novel organic coated kaolin clay having organophilic properties. A more particular object is to provide a finely divided kaolin clay product especially useful as a reinforcing filler in a thermoset resin prepared from a liquid unsaturated polyester resin. Another object is to provide finely divided coated kaolin clay which can be dispersed readily in liquid unsaturated polyester resins in appreciable quantities without significantly increasing the viscosity of the resin. Still another object of my invention is the provision of organic coated kaolin clay which, when used as a filler, increases the tensile strength and frequently the flexural strength of kaolin filled plastics made from unsaturated polyester resins. A further object of my invention is the provision of improved molding compositions containing liquid polymerizable unsaturated polyester resins.

Further objects and features of the invention will be apparent from the description thereof which follows.

I have discovered that the usefulness of kaolin clay as a filler in plastics prepared from liquid polymerizable unsaturated polyester resins may be improved by coating the clay, prior to its incorporation into the liquid resin, with a very small quantity of certain salts of monomeric, polymerizable olefinic carboxylic acids.

Briefly stated, the novel filler of my invention consists of a coarse fractioned kaolin clay, the particles of the clay being uniformly coated with from about 0.25 to 5.0 percent, based on the weight of the clay dried to constant weight at 220° F., of a divalent metal salt of a polymerizable, carboxylic acid having an alpha-beta enol structure, especially acrylic and (trans)crotonic acids.

The coated kaolin clay product is useful in the production of molded plastics from polymerizable liquid unsaturated polyesters by both the premix and preform methods, especially the former. In both types of molding compositions, the coated clay product may be dispersed more readily in the liquid polyester than the normally hydrophilic naturally occurring clay, and the tendency of the clay filler to body the filler will be markedly less pronounced than when the naturally occurring clay is used in equivalent amount. As a result, more of the coated clay can be dispersed in the molding composition without adversely increasing the viscosity of the mixture. In the case of premixes or "gunks," as they are usually called, the thermoset resin filled with the coated clay has appreciably higher tensile strength and usually greater flexural strength than a like resin filled with the same quantity of naturally occurring clay of the same or finer particle size. In preforms, the use of the coated clay will result in a laminate having higher flexural strength than a laminate prepared with uncoated clay.

More specifically, the salts I employ as coating agents for the clay are divalent metal salts of polymerizable acids such as acrylic acid, (trans)crotonic acid, methacrylic acid, and sorbic acid. Preferred are salts of the alkaline earths, i.e., calcium, magnesium and barium salts; strontium salts may be used although their high cost will usually make them less desirable than salts of the more abundant calcium and magnesium alkaline earth metals. Where high water resistance is sought, the zinc and lead salts will be preferred. Especially useful are the calcium salts. From the standpoint of performance and economy, I prefer to use the calcium salt of acrylic acid or the calcium salt of (trans)crotonic acid. The salts should be substantially free from unreacted metallic ions inasmuch as their presence will detract from the strength propertiees of the polyester plastic as well as impairing the water resistance of the plastic product. The presence of unreacted acid, even in relatively large quantities, such as one mol free acid per mol of salt, will not be deleterious.

The acid component of the salts are characterized by being polymerizable through carbon to carbon unsaturation, especially in the presence of peroxide catalysts; the presence of the alpha-beta enol structure in these acids accounts for the activity of the olefinic double bond in the acid. It is believed that the acid coated on the clay interpolymerizes with the unsaturated polyester during the cure of the resin and that this accounts for the improved strength properties of the polyester which has been filled with the coated clay.

The clay I employ is kaolin clay, by which is meant a clay whose predominating mineral specie is kaolinite, halloysite, anauxite, dickite or nacrite. These minerals are all hydrous aluminum silicates of the empirical formula $Al_2O_3,2SiO_2.2H_2O$. Kaolin clay, as mined, consists of fine particles together with coarse agglomerates and grit (principally quartz). It is the usual practice of clay processors to remove from the clay coarse agglomerates and gritty matter. It is the nature of the resultant whole clay to be substantially free from particles coarser than 44 microns (325 mesh) and to consist of fine particles which usually have an average equivalent spherical diameter of about 0.5 micron. Some deposits will yield a whole clay having a somewhat larger or smaller average particle size. All micron particle sizes, as used herein, are expressed as equivalent spherical diameters and are obtained by the well-known Andreasen method (a water sedimentation method) assigning 2.5 as the value of particle density. The term "average equivalent spherical diameter" refers to the particle size of a material which is so chosen that 50 percent by weight of the particles will be finer than that value. For some commercial uses, kaolin clay is fractionated, as by hydraulic or air sedimentation methods, to obtain a fraction of clay having the desired particle size. Usually the clay is fractionated to obtain a very fine fraction which is particularly useful as an ingredient of paper coating compositions. This leaves a coarse fraction, the particle size distribution of which will depend on the amount of fines removed from the whole clay during the fractionation.

In carrying out my invention, I employ fractionated clay which has an average equivalent spherical diameter no less than about 1.5 microns, and preferably employ coarse fractionated kaolin which has an equivalent spherical diameter of from 4 to 15 microns. The clay is free from grit and particles larger than 44 microns. Clay finer than 1.5 microns in average equivalent spherical diameter, e.g., whole clay, fine fractions of whole clay, or clay which has been finely ground as in a fluid energy mill, are not benefited by treatment with the metallic salt coating composition as is the coarse clay. The reason for this phenomenon is not presently fully understood.

In putting my invention into practice, I uniformly coat the clay particles with a very small quantity of the metallic salt coating material; a variety of methods are suitable for the purpose. The simplest procedure involves dry milling the clay with an appropriate quantity of metallic salt. Inasmuch as the effectiveness of the coating depends on its uniform distribution on the surface of the clay particles, the metallic salt will preferably be applied to the clay in the presence of a solvent for the metallic salt (usually water) after which the solvent will be removed by drying. Particularly good results have been obtained by forming the clay coating agent in situ. In accordance with the latter procedure, an oxide or hydroxide of the metal, e.g., hydrated lime, is incorporated in aqueous clay slurry containing an equimolal quantity of an acid, such as acrylic acid, or vice versa. The slurry is vacuum filtered or reduced to a wet cake by any suitable means, dried at about 250° F. to remove residual water and then pulverized.

The optimum quantity of metallic salt coated on the clay will depend on the particle size of the clay and will vary inversely with the particle size of the clay. The quantity of coating agent will usually be kept at the minimum at which the coating agent is effective in enhancing the filler properties of the clay in order to avoid the adverse effect of large quantities of metallic ions on the electric properties and water resistance of the polyester resin formulated therewith. For example, a coarse fractionated clay having an average equivalent spherical diameter of about 10 microns will preferably be coated with metallic salt in amounts of 0.5 percent by weight, whereas about 1 to 2 percent of coating will be suitable for 5 micron clay.

The liquid unsaturated polyester resins I employ are obtained by reacting together a dihydric alcohol and a dibasic acid, either of which contains a pair of double bonded carbon atoms. The unsaturated long chain polyester molecule is essentially linear and is capable of being cross-linked to form a thermosetting resinous solid through the double bonds in the ester. A liquid unsaturated monomer, such as styrene, is employed as a crosslinking solvent, and an organic peroxide is usually employed to catalyze the crosslinking reaction. The thermoset product consists of a long chain ester linked into a three-dimensional resin with carbon to carbon crosslinks. The unsaturated polyesters are characterized by thermosetting without evolution of water. Commercial unsaturated polyester resins usually contain a mixture of unsaturated polyesters and unsaturated monomeric solvent.

Polyols used in the preparation of commercial polyesters include: ethylene glycol; propylene glycol; 1:3 butylene, 2:3 butylene and 1:4 butylene glycols; diethylene glycol and triethylene glycol.

Maleic anhydride and fumaric acid are the most frequently used unsaturated acids in the preparation of unsaturated polyesters; maleic acid is used to a lesser extent. Other suitable unsaturated acids are citraconic acid, mesaconic acid, itaconic acid and 3:6 endomethylene tetrahydro phthalic anhydride. Equimolal proportions of glycol and dibasic acid are usually used. The unsaturated acid is frequently modified with a saturated dibasic acid, usually phthalic acid or anhydride, sebacic acid and adipic acid, to improve the flexibility of the thermoset product. In some instances trihydric alcohols, such as glycerine or castor oil, or higher alcohols, such as pentaerythritol or sorbitol, are used to modify the product.

Styrene, diallylphthalate and triallyl cyanurate are the principal crosslinking agents.

As mentioned, the crosslinking reaction is catalyzed with a peroxide catalyst, usually benzoyl peroxide. Other catalysts are methylethylketone peroxide and methyl isobutyl ketone peroxide.

Accelerators, stabilizers, promoters, coloring agents may be incorporated in the polyester when desired, as well as auxiliary fillers such as fibrous asbestos, calcium carbonates, etc.

In the preparation of moldable polyester mixes employing the novel coated kaolin, the clay is added to the unsaturated liquid polyester resin in the same manner and with equipment usually employed for adding clay or other fillers to the resin.

The quantity of coated clay I prefer to employ is from 20 to 200 percent, based on the weight of the liquid unsaturated polyester (inclusive of the polymerizable monomer, such as styrene). In the preparation of gunk molding mixtures containing glass fibers I prefer to employ about 50 to 150 parts of coated clay to 100 parts by weight of liquid polyester; in some instances the quantity of glass fibers may be reduced from that normally employed in premixes when my coated clay is used; a suggested proportion of glass fibers is from 10 to 30 parts per 100 parts of polyester. In laminating mixes, I prefer to use from about 20 to 100 parts by weight of coated clay to 100 parts by weight of polyester.

After the coated clay is dispersed in the liquid, polymerizable unsaturated monomer and catalyst added, the mixture is placed in a suitable mold and cured in a manner applicable to the particular polyester resin employed.

My invention is illustrated in further detail by the following examples in which all proportions of ingredients are in parts by weight unless otherwise specified.

EXAMPLE I (Ia) Various particle size samples of Georgia kaolin clay were coated with calcium acrylate in amount of 0.5 to 2.0 percent (based on the weight of the clay after drying to constant weight at 220° F.). Other samples of these clays were coated with 0.5 to 2.0 percent of calcium (trans)crotonate. The clays were: a water-washed grit-free kaoline clay having an average equivalent spherical diameter of 0.5 micron and supplied under the trade name ASP 100 by Minerals & Chemicals Corporation of America; a degritted coarse fraction of kaolin clay having an average equivalent spherical diameter of 4.8 microns and supplied under the trade name ASP 400 by Minerals & Chemicals Corporation of America; and kaoline clay having an average equivalent spherical diameter of 1.5 microns and supplied under the trade name ASP 900 by Minerals & Chemicals Corporation of America.

In the preparation of the various coated clays, the dry clay was placed in a mixing vessel. A 10 percent solution of calcium acrylate or calcium crotonate was slowly added to the clay. The materials were rapidly agitated for ten minutes after all of the coating material had been added and the wet samples held in a forced draft oven at 250° F. for two hours for drying. After drying, the samples were placed in a high speed hammer mill while they were still hot and the samples, after cooling, were placed in sealed glass jars.

(Ib) The rheology of suspensions of the coated clays of (Ia) in a liquid polyester resin were investigated. The unsaturated polyester was Polyite 8007, a low reactivity polyester prepared by esterification of ethylene glycol with fumaric acid and containing 40 percent styrene monomer. For purposes of comparison, the viscosities of the unfilled resin at various rates of shear, as well as the viscosity of the resin in which the uncoated clays were suspended, were determined. Viscosity measurements were made immediately after preparation of suspensions and also after the suspensions aged seven days. The results are tabulated in Table I.

The results tabulated in Table I show coating all particle sizes of clay with a small quantity of calcium acrylate or calcium crotonate resulted in a reduced tendency of the clay to increase the viscosity of the polyester resin. Also illustrated is that most of the resins containing coated clay had a lower viscosity at the lower shear rate than the resin per se whereas all of the uncoated clays, particularly the 0.5 and 1.5 micron uncoated clays, appreciably increased the viscosity of the liquid resin at low or high shear.

Table I

THE EFFECT OF COATING VARIOUS PARTICLE SIZES OF KAOLIN CLAY WITH CALCIUM ACRYLATE OR CALCIUM CROTONATE ON THE VISCOSITY OF SUSPENSIONS IN AN UNSATURATED POLYESTER RESIN

| Clay Filler Av. Equivalent Spherical Diam. | Clay Coating | Percent Coating | Brookfield Viscosity, cp×10³ | | | |
|---|---|---|---|---|---|---|
| | | | Initial | | After 7 days | |
| | | | 10 r.p.m. | 100 r.p.m. | 10 r.p.m. | 100 r.p.m. |
| No filler | | | 4.2 | 4.3 | 4.5 | 4.5 |
| 0.5 microns [1] | No coating | | 15.5 | 4.3 | 11.1 | 4.1 |
| 1.5 microns [2] | do | | 29.5 | 8.6 | 23.5 | 7.6 |
| 4.8 microns [2] | do | | 9.7 | 4.3 | 8.5 | 4.5 |
| 0.5 microns [1] | Calcium crotonate. | 0.5 | 2.2 | 2.4 | 2.9 | 3.0 |
| 1.5 microns [2] | do | 2 | 1.8 | 2.3 | 5.9 | 3.6 |
| 4.8 microns [2] | do | 1 | 2.2 | 2.3 | 2.7 | 2.2 |
| 0.5 microns [1] | Calcium acrylate. | 1 | 1.4 | 1.6 | 1.7 | 2.0 |
| 1.5 microns [2] | do | 0.5 | 8.2 | 5.2 | 11.2 | 6.27 |
| 4.8 microns [2] | do | 2 | 2.3 | 3.2 | 2.8 | 2.8 |

[1] 30 parts clay/70 parts Polylite 8007 resin.
[2] 40 parts clay/60 parts Polylite 8007 resin.

(Ic) The strength characteristics of molded Polylite 8007 resins which were filled with various quantities of calcium acrylate or calcium crotonate coated kaolin clays were compared with the strength characteristics of the same resin filled with like quantities of uncoated clay and the unfilled resin. The results are tabulated in Table II. In the preparation of the moldings, portions of the freshly prepared resin-filled mixes of Example (Ib) were molded after addition of 1 percent of benzoyl peroxide catalyst (based on the weight of polyester including styrene monomer). The mixes were cast in a glass mold which consisted of a U-shaped piece of ⅛-inch asbestos gasketing 1-inch wide and having 12-inch legs. Silicone mold releasing agent was applied to the gasket which was placed between two pieces of plate glass (each 1-foot square) and which had been sprayed with mold release agent. This assembly was secured and filled with the resin filler mixture.

The resin was cured by placing the filled mold in a cold forced draft oven and raising the oven temperature to 180° F. in an hour. The temperature was held at 180° F. for one hour and shut off. The mold and oven were permitted to cool to room temperature.

The results given in Table II show that the tensile strength of the cast polyester resin was lowered appreciably by the use of all grades of uncoated clay and that coating of the coarse (4.8 micron clay) with calcium acrylate or calcium crotonate significantly reduced the tendency of that clay to reduce the tensile strength of the molded plastic. The 1.5 micron kaolin was improved by the coating, but to a lesser extent than the 4.8 micron clay. In the case of the fine 0.5 clay, this beneficial effect of the calcium acrylate or crotonate coating on the clay was not observed. The flexural strength of plastics filled with the calcium acrylate or calcium crotonate coated 4.8 micron clay was almost as good as that of the unfilled resin and was a slight improvement over that of the plastic filled with the uncoated 4.8 micron clay.

Table II

THE EFFECT OF COATING VARIOUS PARTICLE SIZES OF KAOLIN CLAY FILLERS WITH CALCIUM ACRYLATE OR CALCIUM CROTONATE ON THE STRENGTH PROPERTIES OF MOLDED UNSATURATED POLYESTER RESIN

| Clay Filler, Av. Equivalent Spherical Diam. | Clay Coating | Percent Coating | Tensile Strength, p.s.i.×10³ ASTM: D638–58T | Flexural Strength, p.s.i.×10³ ASTM: D790–58T | Barcol Hardness |
|---|---|---|---|---|---|
| No filler | | | 8.47 | 10.25 | 39.5 |
| 0.5 microns [1] | No coating | | 5.27 | 9.71 | 43.4 |
| 1.5 microns [2] | do | | 4.13 | 8.29 | 44.8 |
| 4.8 microns [2] | do | | 5.34 | 9.69 | 42.8 |
| 0.5 microns [1] | Calcium crotonate | 0.5 | 4.40 | 8.55 | 44.6 |
| 1.5 microns [2] | do | 2 | 4.81 | 7.61 | 45.6 |
| 4.8 microns [2] | do | 1 | 7.24 | 9.89 | 45.0 |
| 0.5 microns [1] | Calcium acrylate | 1 | 4.78 | 10.40 | 45.2 |
| 1.5 microns [2] | do | 0.5 | 6.00 | 8.64 | 44.4 |
| 4.8 microns [2] | do | 2 | 7.70 | 10.00 | 45.8 |

[1] 30 parts clay/70 parts Polylite 8007 resin.
[2] 40 parts clay/60 parts Polylite 8007 resin.

EXAMPLE II

The 4.8 micron clay of Example I (ASP 400) was coated with 1 percent by weight of other coatings, including calcium salts of other olefinically unsaturated acids as well as salts, other than the calcium, of crotonic acid. The effect of such coatings on the properties of the Polylite 8007 resin filled with the clay was studied. Also prepared were samples of the 4.8 micron clay which was coated by adding the hydroxide of the metal to the alpha-beta enol unsaturated acid dissolved in a slurry of the clay, drying the slurry at 250° F. and micronizing the hot coated clay.

The clays were mixed into the polyester employed in Example I, and the Brookfield viscosity and physical properties of the molded resin compositions were investigated. The results are summarized in Table III.

The results reported in Table III show that plastics filled with coarse kaolin coated with 1 percent of calcium acrylate or calcium sorbate had good flexural strength and a higher tensile strength than the plastics filled with the uncoated clay and that such coated clays did not body the liquid polyester resin as did the uncoated clay.

Also shown is that neutral calcium acrylates are superior as a coating agent to the calcium acrylate salt containing unreacted base. The results show, too, that amine neutralized crotonic acid is not a suitable coating agent since the plastic filled with clay coated with the diethylamine salt of crotonic acid had a much lower tensile strength than the plastic filled with naturally occurring clay; also the amine did not significantly lower the viscosity of the resin filled with the clay, and, on standing, causing the resin to gel.

Table III

THE EFFECT OF COATING 4.8 MICRON KAOLIN CLAY WITH VARIOUS SALTS OF OLEFINICALLY UNSATURATED CARBOXYLIC ACID ON THE PROPERTIES OF POLYESTER RESIN[1] BEFORE AND AFTER MOLDING

| Clay Coating [2] | Tensile Strength, p.s.i. ×10 ASTM: D638–58T | Flexural Strength, p.s.i. ×10³ ASTM: D790–587 | Barcol Hardness | Brookfield Viscosity, cp ×10³ | | | |
|---|---|---|---|---|---|---|---|
| | | | | Initial | | After 7 days | |
| | | | | 10 r.p.m. | 100 r.p.m. | 10 r.p.m. | 100 r.p.m. |
| No filler | 8.47 | 10.25 | 39.5 | 4.2 | 4.3 | 4.5 | 4.5 |
| Uncoated Clay | 5.34 | 9.69 | 42.8 | 9.7 | 4.3 | 8.5 | 4.5 |
| Calcium Acrylate, Hydrated | 6.28 | 8.85 | 46 | 1.9 | 1.8 | 7.0 | 3.9 |
| Calcium Acrylate, containing 2% free Ca(OH)₂ | 5.55 | 11.52 | 45 | 2.0 | 1.9 | 2.6 | 2.5 |
| 1 mol Hydrated Lime and 1 mol Acrylic Acid | 6.18 | 10.6 | 45 | 1.6 | 1.6 | 2.5 | 2.2 |
| 1 mol Hydrated Lime and 1 mol Sorbic Acid | 6.22 | 10.96 | 45 | 2.0 | 2.05 | 3.0 | 2.8 |
| 1 mol Ba(OH)₂ and 1 mol Crotonic Acid | 5.22 | 10.2 | 45 | 2.4 | 2.08 | 3.0 | 2.6 |
| 1 mol Diethylamine and 1 mol Crotonic Acid | 2.55 | | | 8.1 | 3.1 | gel | gel |

[1] 40 parts clay/60 parts Polylite 8007.
[2] All coating at 1% of coating, based on dry clay weight.

I am aware that it is known to treat various clays with organic substances to effect a modification in the surface properties of the clay (and thereby alter the viscosity of liquid organic systems containing the clay). Some of the procedures for treating clay have involved applying to the clay an organic compound which is fixed to the clay by more or less physical forces. Most of the procedures have involved the use of a coating agent having surface active properties. In contrast the salts I employ are not surface active agents. Other procedures for modifying the surface properties of clays entail the quantitative replacement of constituents of the clay with an organic compound so as to form a chemical bond between the clay and organic component. Esterification of clay exemplifies the latter procedure. Still another embodiment of the modification of clay by chemical reaction involves the exchange of inorganic cations of a suitable clay with cations of an organic compound. One of the most familiar applications of the latter method is the exchange of inorganic cations of clay with a long chain cation of an onium compound having surface active properties, e.g., a long chain amine containing nitrogen in its pentavalent state, to produce an organophilic onium clay. This procedure is a base-exchange reaction and obviously the clays useful in the process are limited to those clays which have an appreciable quantity of exchangeable inorganic cations, i.e., a clay having a high base exchange capacity such as the swelling bentonite clays which normally have a base exchange capacity of at least about 80 meq./gm. Kaolin clay has a low base-exchange capacity, usually 6 meq./gm. or less, for a typical Georgia kaolin clay unless the kaolin clay has been freshly ground to an extremely fine particle size, in which case the base-exchange capacity of the kaolin is improved somewhat. As a result, kaolin clay is not normally adapted to modification with organic compounds by base-exchange procedures.

I am also aware that U.S. 2,401,348 to Hauser et al. discloses an adaptation of the base-exchange reaction of clay with organic compounds and has to do with the production of molded articles from the finely divided ion exchange compound of from about 30 to 70 parts of a solid having a high base-exchange capacity and 70 to 30 parts of an ionizable salt of an acid, such as, for example, acrylic acid. As in the case of other treatments of clays in which the inorganic cations of clays are exchanged for cations of an organic compound, the procedure of the patent is applicable only to kaolin clay which has been ground very finely. In contrast, I find coarse clay, especially coarse fractionated clay, applicable and, moreover, I merely coat the clay with acrylate salt and employ only very small quantities of organic salt relative to clay. My coated clay product is useful as a filler in a polymerizable resin whereas the product of patent is per se a moldable composition.

I claim:

1. Fractionated kaolin clay which is substantially free from particles larger than 44 microns and has an average equivalent spherical diameter of at least 1.5 microns, the particles of said clay being uniformly coated with from 0.25 percent to 5.0 percent by weight of a divalent metal salt of a polymerizable acid selected from the group consisting of acrylic, crotonic, methacrylic and sorbic.

2. Fractionated kaolin clay which is substantially free from particles larger than 44 microns and has an average equivalent spherical diameter of 1.5 to 15 microns, the particles of said clay being uniformly coated with from 0.25 percent to 5.0 percent by weight of a divalent metal salt of a polymerizable acid selected from the group consisting of acrylic, crotonic, methacrylic and sorbic.

3. The composition of claim 2 in which the average equivalent spherical diameter of said clay is from 4 to 15 microns.

4. Fractionated kaolin clay which is substantially free from particles larger than 44 microns and has an average equivalent spherical diameter of 1.5 to 15 microns, the particles of said clay being uniformly coated with from 0.25 percent to 5.0 percent by weight of an alkaline earth metal salt of a polymerizable acid selected from the group consisting of acrylic, crotonic, methacrylic and sorbic.

5. The product of claim 4 in which said acid is crotonic acid.

6. The product of claim 4 in which said acid is acrylic acid.

7. Fractionated kaolin clay which is substantially free from particles larger than 44 microns and has an average equivalent spherical diameter of 1.5 to 15 microns, the particles of said clay being uniformly coated with from 0.25 percent to 5.0 percent by weight of calcium acrylate.

8. Fractionated kaolin clay which is substantially free from particles larger than 44 microns and has an average equivalent spherical diameter of 1.5 to 15 microns, the particles of said clay being uniformly coated with from 0.25 percent to 5.0 percent by weight of calcium crotonate.

References Cited in the file of this patent

UNITED STATES PATENTS

| | | |
|---|---|---|
| 2,290,914 | Machlin | July 28, 1942 |
| 2,757,160 | Anderson | July 31, 1956 |
| 2,840,538 | Minter | June 24, 1958 |
| 2,948,632 | Albert et al. | Aug. 9, 1960 |